United States Patent
Takahashi

(10) Patent No.: US 10,446,928 B2
(45) Date of Patent: Oct. 15, 2019

(54) PHASED ARRAY ANTENNA

(71) Applicant: Mitsubishi Electric Corporation, Chiyoda-ku (JP)

(72) Inventor: Tomohiro Takahashi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/342,061

(22) PCT Filed: Jun. 7, 2018

(86) PCT No.: PCT/JP2018/021881
§ 371 (c)(1),
(2) Date: Apr. 15, 2019

(87) PCT Pub. No.: WO2018/225824
PCT Pub. Date: Dec. 13, 2018

(65) Prior Publication Data
US 2019/0237869 A1    Aug. 1, 2019

(30) Foreign Application Priority Data
Jun. 9, 2017 (JP) .................................. 2017-114670

(51) Int. Cl.
*H01Q 1/28* (2006.01)
*H01Q 3/30* (2006.01)

(52) U.S. Cl.
CPC .................. *H01Q 3/30* (2013.01); *H01Q 1/28* (2013.01)

(58) Field of Classification Search
CPC .. H01Q 1/28; H01Q 3/30; H01Q 3/26; H01Q 19/06
(Continued)

(56) References Cited

U.S. PATENT DOCUMENTS

| 5,427,927 A | 6/1995 | Meyer et al. |
| 7,554,508 B2 * | 6/2009 | Johnson ................... H03D 7/00 343/893 |

(Continued)

FOREIGN PATENT DOCUMENTS

| EP | 0 520 908 A1 | 12/1992 |
| JP | 5-501360 A | 3/1993 |

(Continued)

OTHER PUBLICATIONS

International Search Report dated Aug. 21, 2018 in PCT/JP2018/021881 filed on Jun. 7, 2018.

*Primary Examiner* — Huedung X Mancuso
(74) *Attorney, Agent, or Firm* — Oblon, McClelland, Maier & Neustadt, L.L.P.

(57) ABSTRACT

A phased array antenna includes a signal source, a distribution circuit, phase shifters, amplifiers, antenna elements, and a control device. The signal source generates a signal. The distribution circuit divides the signal generated by the signal source. The phase shifters shift phases of signals divided by the distribution circuit to change an orientation direction in which electromagnetic wave is emitted. The amplifiers amplify signals output by the phase shifters. The antenna elements emit, as the electromagnetic wave, signals output by the amplifiers. The control device controls the amplifiers such that, in a plane that is parallel to an orbital plane of a satellite with which communication of the electromagnetic wave is established, amplitudes of amplifiers, among the amplifiers, which are arranged in the center of the plane are greater than amplitudes of amplifiers, among the amplifiers, arranged at the periphery.

20 Claims, 15 Drawing Sheets

(58) Field of Classification Search
USPC .......................................................... 343/705
See application file for complete search history.

(56) References Cited

U.S. PATENT DOCUMENTS

| | | | | |
|---|---|---|---|---|
| 8,880,002 | B2* | 11/2014 | Falck | ........................ H01Q 3/24 |
| | | | | 343/703 |
| 9,762,088 | B2* | 9/2017 | Homma | ................... F27D 11/12 |
| 2014/0153592 | A1* | 6/2014 | Nishikata | .............. H01S 3/0903 |
| | | | | 372/2 |
| 2016/0141754 | A1* | 5/2016 | Leyh | ...................... H01Q 3/247 |
| | | | | 342/372 |

FOREIGN PATENT DOCUMENTS

| | | |
|---|---|---|
| JP | 6-500909 A | 1/1994 |
| JP | 6-132717 A | 5/1994 |
| JP | 6-252636 A | 9/1994 |
| JP | 9-214241 A | 8/1997 |
| JP | 2006-333068 A | 12/2006 |

\* cited by examiner

BEAM SCANNING ANGLE [DEGREES]

BEAM SCANNING ANGLE [DEGREES]

PHASED ARRAY ANTENNA

TECHNICAL FIELD

The present disclosure relates to a phased array antenna.

BACKGROUND ART

A phased array antenna is an antenna that includes an array of antenna elements and is configured to control a radiation pattern of the whole of the antenna by controlling a phase and an amplitude of an exciting current for each of the antenna elements. Without mechanically driving of the phased array antenna, a beam can be scanned at high speed. Accordingly, when the phased array antenna is mounted on a moving body, the beam can be directed to a target of communication with the antenna by scanning the beam even though the moving body moves or shakes during operation. Due to this characteristic of the antenna, a large number of phased array antennas are used as satellite communication antennae mounted on moving bodies.

Patent Literature 1 discloses an antenna tracking apparatus for a mobile terminal including a phased array antenna, a global positioning system (GPS) receiver, a terminal control information receiver to receive terminal control information distributed from a quasi-zenith satellite via the phased array antenna, an attitude angle sensor and a direction sensor to detect a three-dimensional attitude angle of the mobile terminal, an array factor calculator to correct the terminal control information by the amount of the attitude angle, and a directional controller to control direction of the phased array antenna on the basis of corrected directional control information.

CITATION LIST

Patent Literature

Patent Literature 1: Unexamined Japanese Patent Application Kokai Publication No. 2006-333068

SUMMARY OF INVENTION

Technical Problem

The phased array antenna for satellite communication disclosed in Patent Literature 1 requires that electromagnetic wave emitted by the phased array antenna have low side lobe characteristics in order to prevent the emitted electromagnetic wave from interfering with a satellite other than a geosynchronous satellite that is the target of communication with the phased array antenna. However, there is a problem that total radiant power of and an antenna gain of the whole of the phased array antenna are inevitably decreased if the electromagnetic wave is generated to have low side lobe characteristics with respect to all angles of propagation of the electromagnetic wave.

In consideration of the aforementioned circumstances, an objective of the present invention is to provide a phased array antenna enabling further improved side lobe characteristics of the electromagnetic wave in a plane parallel to an orbital plane of the communication-target satellite as compared with other planes.

Solution to Problem

In order to attain the aforementioned objective, a phased array antenna according to the present disclosure includes a signal source, a distribution circuit, phase shifters, amplifiers, antenna elements, and a control device. The signal source generates a signal. The distribution circuit divides the signal generated by the signal source. The phase shifters shift phases of signals divided by the distribution circuit to change an orientation direction in which electromagnetic wave emitted. The amplifiers amplify signals output by the phase shifter. The antenna elements emit, as the electromagnetic wave, signals output by the amplifiers. The control device controls the amplifiers such that, in a plane that is parallel to an orbital plane of a satellite with which communication of the electromagnetic wave is established, amplitudes of amplifiers, among the amplifiers, which are arranged in the center of the plane are greater than amplitudes of amplifiers, among the amplifiers, that are arranged at the periphery of the plane.

Advantageous Effects of Invention

In the present disclosure, the amplitudes of the amplifiers arranged in the center of the plane are made to become greater than the amplitudes of the amplifiers arranged at the periphery of the plane, where the plane is parallel to the orbital plane of the satellite with which communication is established, and thus the present disclosure can provide a phased array antenna enabling a better improvement in a side lobe characteristic of the electromagnetic waves in the plane in comparison to other planes.

DESCRIPTION OF EMBODIMENTS

Embodiment 1

Figure 1:
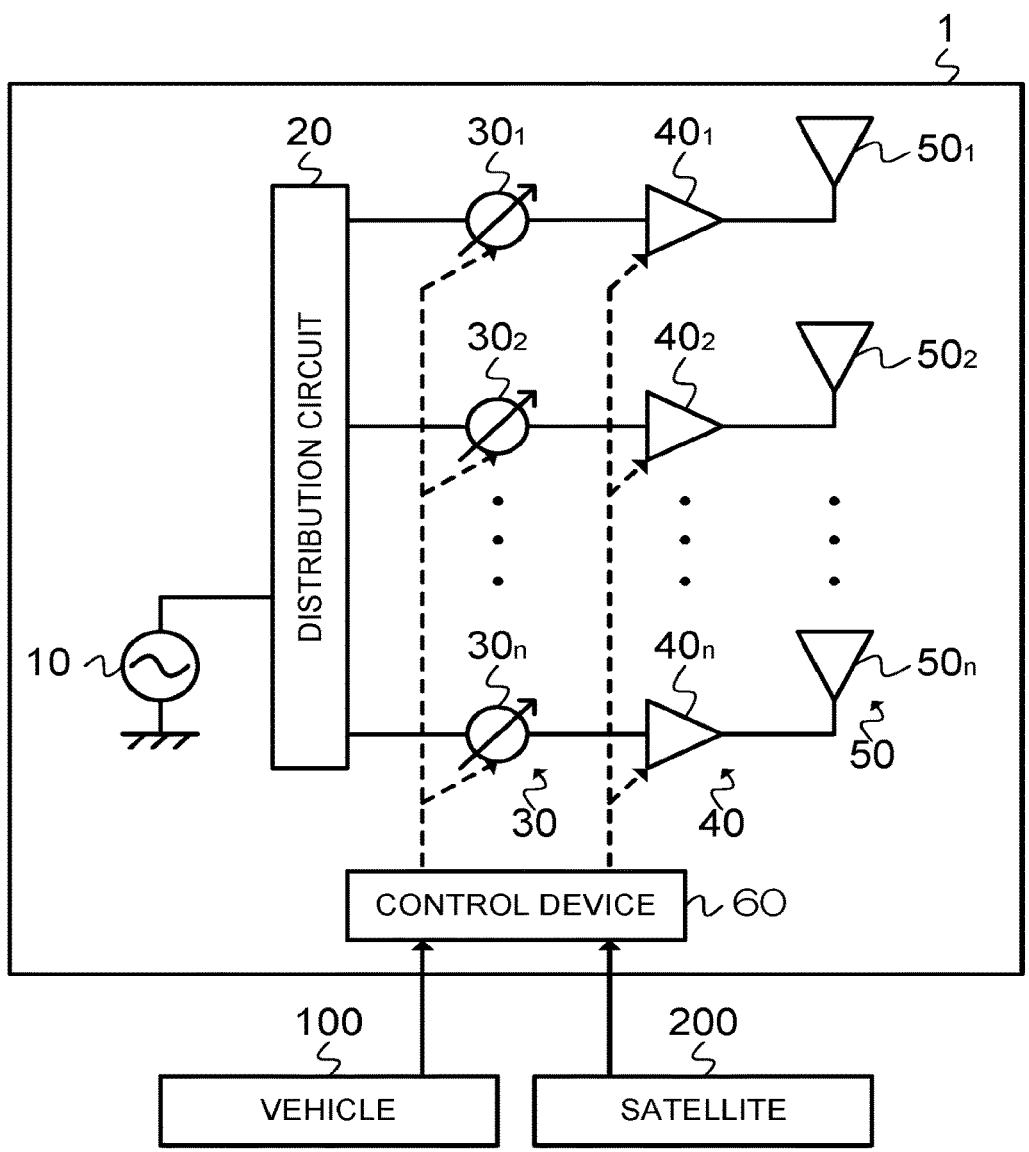
FIG. 1 is a block diagram illustrating a configuration of a phased array antenna according to Embodiment 1.

A phased array antenna 1 according to Embodiment 1 of the present disclosure is described with reference to FIGS. 1-10. In the drawings, components that are the same or equivalent are assigned the same reference sign. The phased array antenna 1 is a wireless communication apparatus including antenna elements and configured to transmit and receive an electromagnetic wave.

FIG. 1 is a block diagram illustrating the configuration of the phased array antenna 1. As illustrated in FIG. 1, the phased array antenna 1 includes a signal source 10 to transmit a radio-frequency (RF) signal, a distribution circuit 20 to divide the signal transmitted by the signal source 10, phase shifters $30_1, 30_2, \ldots$ and $30_n$ to shift phases of signals into which the signal is divided by the distribution circuit 20, amplifiers $40_1, 40_2, \ldots$ and $40_n$ to respectively amplify signals output by the phase shifters $30_1, 30_2, \ldots$ and $30_n$, antenna elements $50_1, 50_2, \ldots$ and $50_n$ to respectively emit the signals output by the amplifiers $40_1, 40_2, \ldots$ and $40_n$, and a control device 60 to control the phase shifters $30_1, 30_2, \ldots$ and $30_n$ and the amplifiers $40_1, 40_2, \ldots$ and $40_n$. The phase shifters $30_1, 30_2, \ldots$ and $30_n$ are collectively called "phase shifters 30". The same applies to the amplifiers 40 and the antenna elements 50.

The phased array antenna 1 as a transmitter is described below. However, the phased array antenna 1 may be a receiver to receive an electromagnetic wave to decode a signal.

Figure 2:
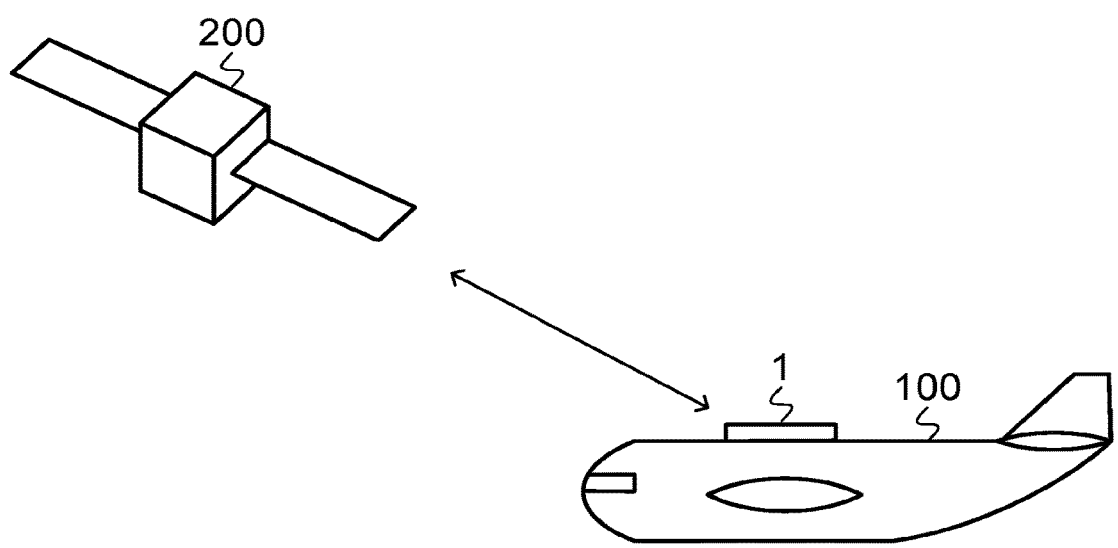
FIG. 2 is a schematic view illustrating a relationship between the phased array antenna according to Embodiment 1, a vehicle, and a satellite.

FIG. 2 is a schematic view illustrating a relationship between the phased array antenna 1, a vehicle 100, and a satellite 200. As illustrated in FIG. 2, the phased array antenna 1 is mounted on the vehicle 100 and establishes wireless communication with the satellite 200. The vehicle 100 is an aircraft such as a fixed-wing aircraft or a rotorcraft. The satellite 200 is a satellite that goes around the earth in a geostationary orbit.

Again with reference to FIG. 1, the signal source 10 is a signal source to transmit a high frequency signal. The signal source 10 outputs the high frequency signal for wirelessly communicating with the satellite 200 with which communication is established.

The distribution circuit 20 distributes to the phase shifters 30 a radio frequency (RF) signal transmitted by the signal source 10. The distribution circuit 20 is connected to the signal source 10 and the phase shifters 30.

The phase shifters 30 alter phases of signals distributed by the distribution circuit 20. The phase shifters 30 include n phase shifters including the phase shifters $30_1, 30_2, \ldots$ and $30_n$. The phase shifters $30_1, 30_2, \ldots$ and $30_n$ are connected to the distribution circuit 20.

The amplifiers 40 amplify signals the phases of which are shifted by the phase shifters 30. The amplifiers 40 include n amplifiers consisting of the amplifiers $40_1, 40_2, \ldots$ and $40_n$. The amplifiers $40_1, 40_2, \ldots$ and $40_n$ are respectively connected to the phase shifters $30_1, 30_2, \ldots$ and $30_n$.

The antenna elements 50 emit, as an electromagnetic wave, signals amplified by the amplifiers 40. The antenna elements 50 include n antenna elements including the antenna elements $50_1, 50_2, \ldots$ and $50_n$. The antenna elements $50_1, 50_2, \ldots$ and $50_n$ are respectively connected to the amplifiers $40_1, 40_2, \ldots$ and $40_n$. Examples of the antenna elements 50 include a horn antenna, a dipole antenna, a slot antenna, and a microstrip antenna. However, the antenna elements 50 are not limited to such examples.

Figure 3:
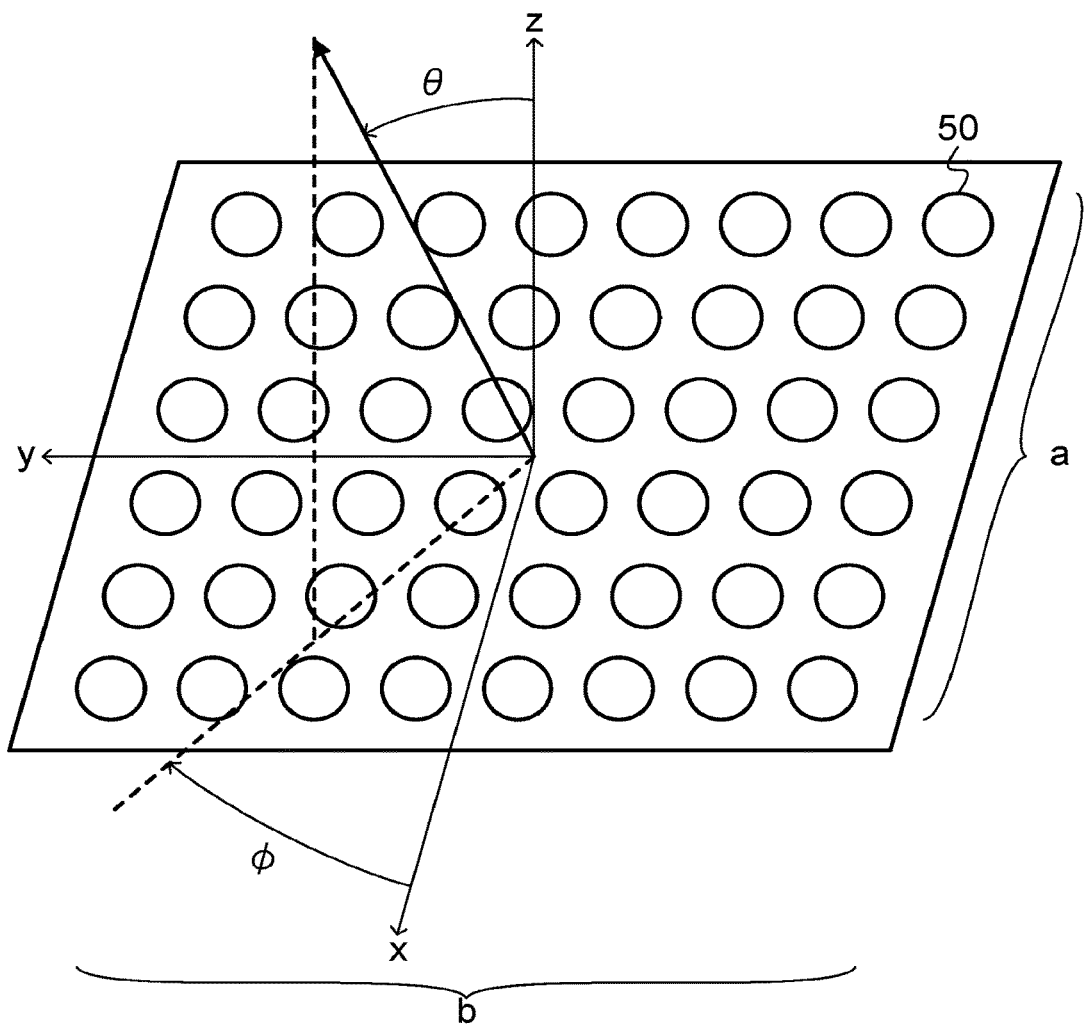
FIG. 3 is a perspective view illustrating arrangement of antenna elements of Embodiment 1.

FIG. 3 is a perspective view illustrating arrangement of the antenna elements 50. As illustrated in FIG. 3, the antenna elements $50_1, 50_2, \ldots$ and $50_n$ are arranged in a rows and in b columns on a plane. The product of the numbers "a" and "b" is equal to the number "n".

Again with reference to FIG. 1, the control device 60 is a control device to control the phase shifters 30 and the amplifiers 40. The control device 60 calculates phase shift values of signals for the phase shifters $30_1, 30_2, \ldots$ and $30_n$ and then transmits the calculated phase shift values to the phase shifters $30_1, 30_2, \ldots$ and $30_n$. Also, the control device 60 calculates amplification values of signals for the amplifiers $40_1, 40_2, \ldots$ and $40_n$ and then transmits the calculated amplification values to the amplifiers $40_1, 40_2, \ldots$ and $40_n$. The examples of the control device 60 can include a central processing unit (CPU). However, the control device 60 is not limited to such an example.

Figure 4:
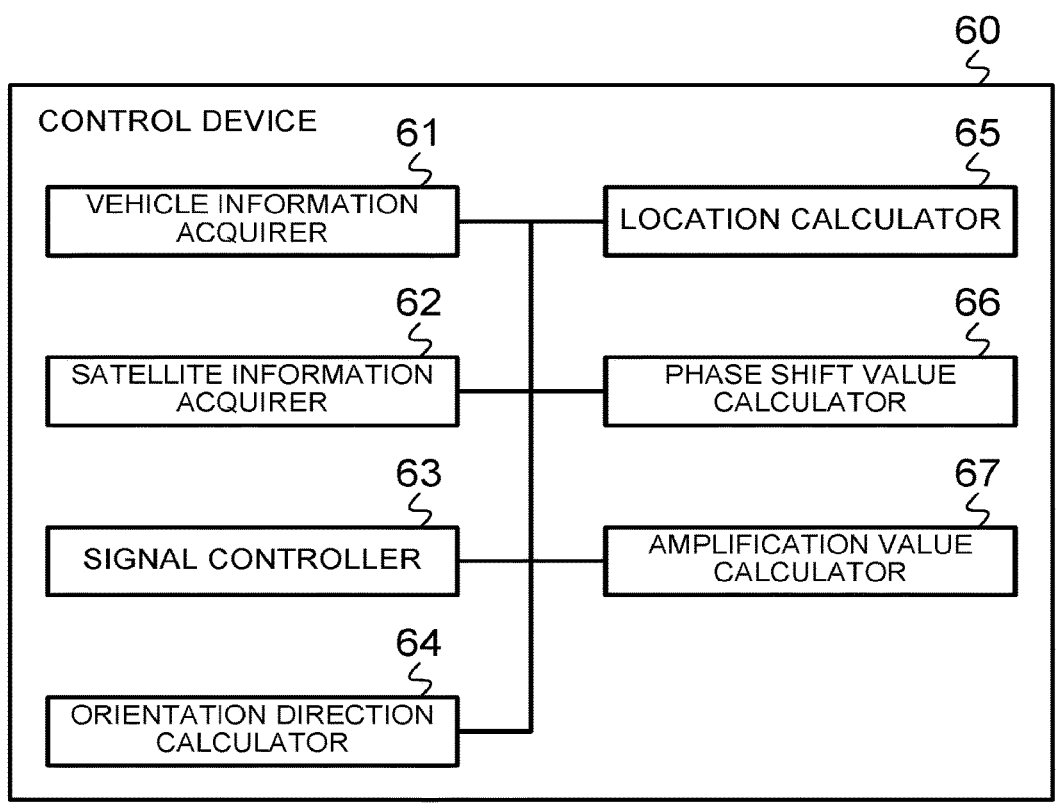
FIG. 4 is a block diagram illustrating a configuration of a control device for Embodiment 1.

FIG. 4 is a block diagram illustrating the configuration of the control device 60. As illustrated in FIG. 4, the control device 60 includes a vehicle information acquirer 61 to acquire location information of the vehicle 100, information about a direction of the nose of the vehicle, and information about a state of the vehicle, a satellite information acquirer 62 to acquire information about the satellite 200, a signal controller 63 to control the signal output by the signal source 10, an orientation direction calculator 64 to calculate an orientation direction in which electromagnetic radiation is emitted, a location calculator 65 to calculate a relative position between the plane of the geostationary orbit and the phased array antenna 1, a phase shift value calculator 66 to calculate the phase shift value from the orientation direction of the beam, and an amplification value calculator 67 to calculate an amplification value from the relative position calculated by the location calculator 65. These components are electrically connected to one another via a bus.

The vehicle information acquirer 61 acquires, from a global positioning system (GPS) and a sensor such as a motion sensor that are included in the vehicle 100, location information indicating a latitude, a longitude and an altitude at which the vehicle 100 is located, nose direction information indicating a direction in which the nose of the vehicle 100 points, and vehicle state information indicating a roll, a pitch, and a yaw of the vehicle 100. The vehicle information acquirer 61 transmits the acquired information to the orientation direction calculator 64 and the location calculator 65.

The satellite information acquirer 62 selects, from multiple satellites, the satellite 200 with which communication is to be established. The satellite information acquirer 62 acquires information about the satellite 200 including a location of the satellite 200 and a frequency and a polarization used for communication with the satellite. The satellite information acquirer 62 transmits the acquired information to the signal controller 63, the orientation direction calculator 64, and the location calculator 65.

The signal controller 63 controls the signal source 10 based on the information about the satellite 200 transmitted from the satellite information acquirer 62 and then sets a frequency of a signal output.

The orientation direction calculator 64 calculates, from the transmitted location information about the vehicle 100, the transmitted nose direction information and the transmitted vehicle state information, and the transmitted information about the satellite 200, an azimuth angle $\varphi$ and an elevation angle $\theta$ representing the orientation direction in which electromagnetic radiation is emitted. As illustrated in FIG. 3, the azimuth angle $\varphi$ is an angle relative to a reference axis on a plane on which the antenna elements 50 are arranged, and the elevation angle $\theta$ is an angle relative to a reference axis perpendicular to the plane. The orientation direction calculator 64 transmits the calculated orientation direction to the phase shift value calculator 66.

Again in reference to FIG. 4, the location calculator 65 calculates, based on the transmitted location information about the vehicle 100, the transmitted nose direction information and the transmitted vehicle state information, and the transmitted information about the satellite 200, the relative position between the plane of the geostationary orbit and the phased array antenna 1. The location calculator 65 calculates, based on the calculated relative position, a value $\varphi_0$ of the azimuth angle $\varphi$ parallel to the plane of the geostationary orbit. The location calculator 65 transmits the calculated value $\varphi_0$ to the amplification value calculator 67.

The phase value calculator 66 calculates, based on the orientation direction transmitted by the orientation direction calculator 64, a phase shift value of the signal regarding each of the phase shifters $30_1$, $30_2$, ... and $30_n$. Upon shifting the phase of the signal in accordance with the phase shift values by each of the phase shifters $30_1$, $30_2$, ... and $30_n$, the electromagnetic wave emitted from the antenna elements 50 propagates in the orientation direction. The phase shift value calculator 66 transmits the calculated phase shift values to the phase shifters $30_1$, $30_2$, ... and $30_n$.

The amplification value calculator 67 calculates, based on the value $\varphi_0$ transmitted from the location calculator 65, an amplification value of the signal of each of the amplifiers $40_1$, $40_2$, ... and $40_n$, and then transmits the calculated amplification value to each of the amplifiers $40_1$, $40_2$, ... and $40_n$.

The amplification value calculator 67 calculates an amplification value relative to the plane of the geostationary orbit, that is, the plane at the azimuth angle having the value $\varphi_0$. In the plane at the azimuth angle having the value $\varphi_0$, amplitudes of the amplification value in the center are greater than amplitudes on the periphery. The low side lobe characteristics of a signal can be obtained by the calculated amplification value. The amplification value calculator 67 calculates an amplification value relative to the plane perpendicular to the plane of the geostationary orbit, that is, the plane at an azimuth angle having the value "$\varphi_0+90°$". An amplitude distribution of the amplification value in the plane at the azimuth angle having the value "$\varphi_0+90°$" is uniform.

Figure 5:
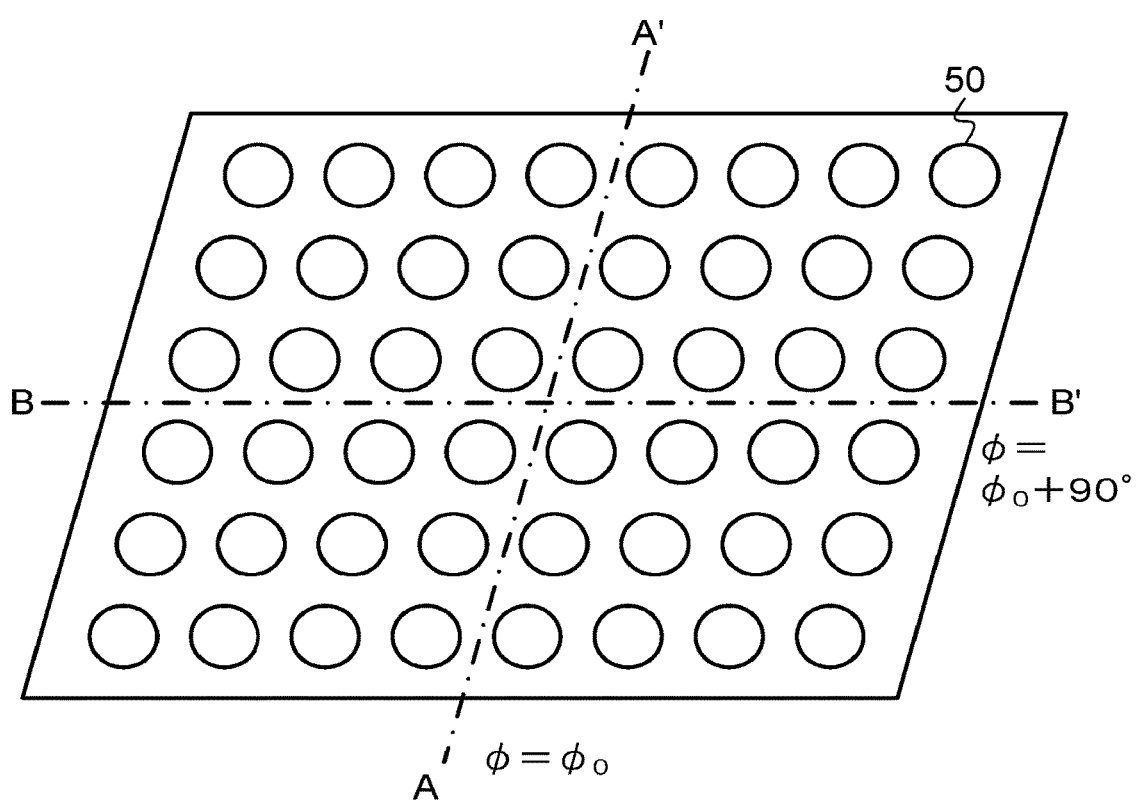
FIG. 5 is a perspective view illustrating a plane of a geostationary orbit of the satellite and a plane perpendicular to the plane of the geostationary orbit, on the antenna elements of Embodiment 1.

FIG. 5 is a perspective view illustrating the plane of the geostationary orbit and the plane perpendicular to the plane of the geostationary orbit, on the antenna elements 50. A line in FIG. 5 corresponding to the angle having the value $\varphi_0$ is an intersection line between the plane of the geostationary orbit and the plane on which the antenna elements 50 are arranged. A line in FIG. 5 corresponding to the angle having the value "$\varphi_0+90°$" is an intersection line between the plane perpendicular to the plane of the geostationary orbit and the plane on which the antenna elements 50 are arranged.

Figure 6:
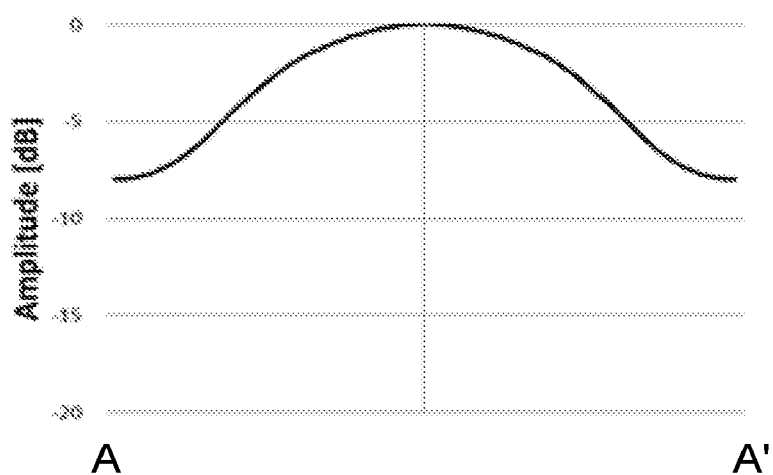
FIG. 6 is a view illustrating an example of an amplitude distribution of a signal occurring in a plane at $\varphi=\varphi_0$ in Embodiment 1.

FIG. 6 is a view illustrating an example of the amplitude distribution of the plane at the angle of $\varphi=\varphi_0$ of the signal. A horizontal axis in FIG. 6 indicates a location on the A-A' line illustrated in FIG. 5, and a vertical axis in FIG. 6 indicates the amplitudes (unit: dB). As illustrated in FIG. 6, the control device 60 produces, in the plane of the geostationary orbit, that is, in the plane at the angle of $\varphi=\varphi_0$, an amplitude distribution in which amplitudes of amplifiers, among the amplifiers 40, that are arranged on the central area are greater than those of amplifiers, among the amplifier 40, that are arranged on an area surrounding the central area, that is, the control device 60 produces an amplitude taper. Although examples of amplitude distributions produced include Taylor distributions, the present disclosure is not limited to such distributions.

Figure 7:
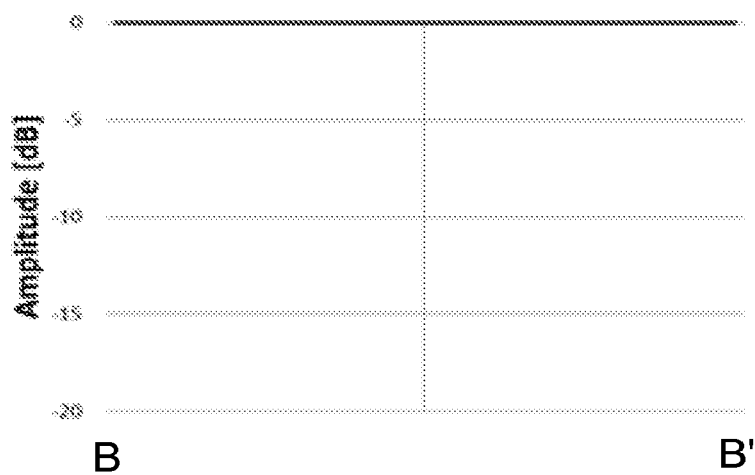
FIG. 7 is a view illustrating an example of an amplitude distribution of the signal occurring in a plane at $\varphi=\varphi_0+90°$ in Embodiment 1.

FIG. 7 is a view illustrating an example of an amplitude distribution occurring in a plane at the angle of $\varphi=\varphi_0+90°$ of the signal. A horizontal axis in FIG. 7 indicates a location on the B-B' line illustrated in FIG. 5, and a vertical axis in FIG. 7 indicates the amplitudes (unit: dB). As illustrated in FIG. 7, the control device 60 produces, in the plane perpendicular to the plane of the geostationary orbit, that is, the plane at an azimuth angle of $\varphi=\varphi_0+90°$, an amplitude distribution in which all of the amplifiers 40 are uniform in amplitude.

Figure 8:
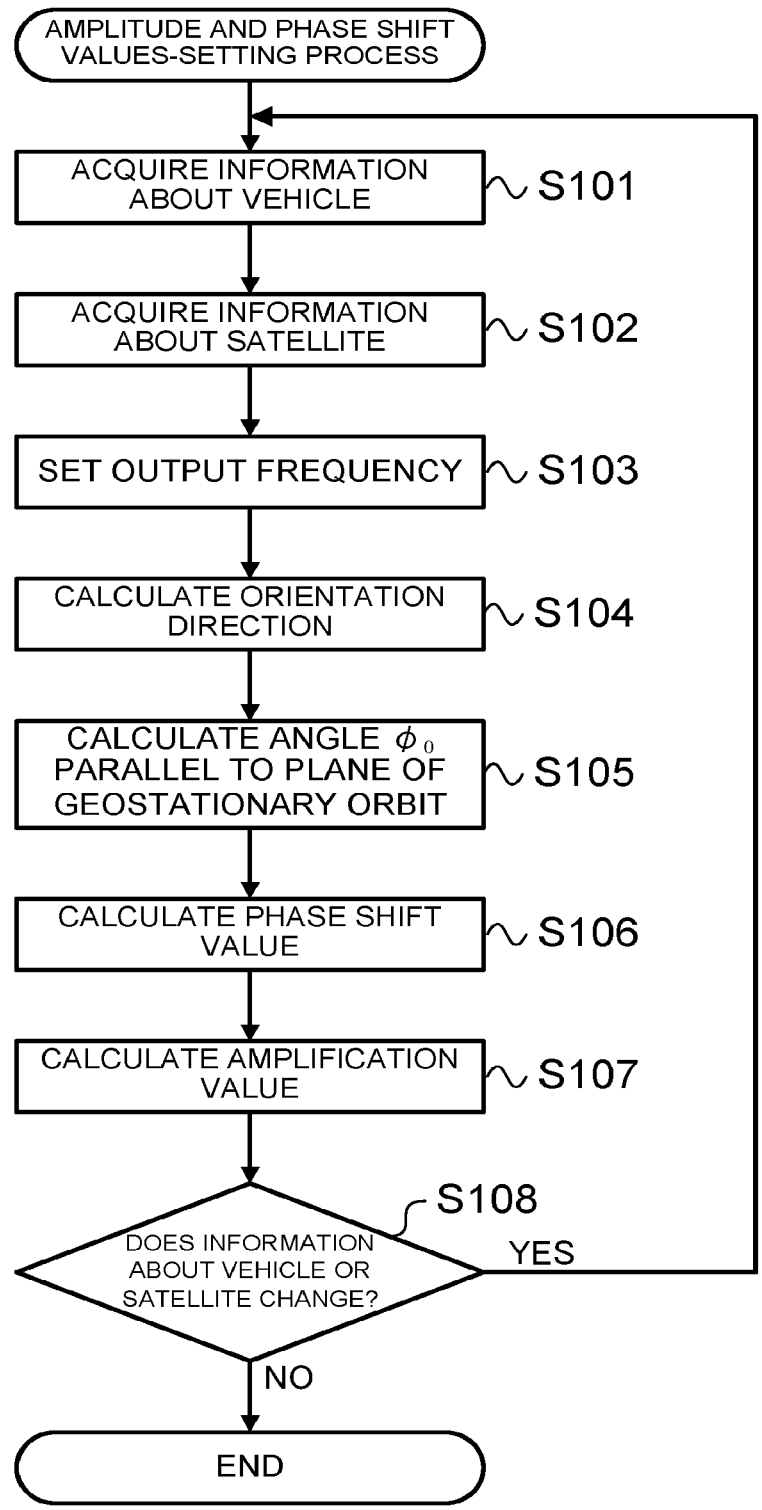
FIG. 8 is a flow chart illustrating an amplitude and phase shift values-setting process in Embodiment 1.

FIG. 8 is a flow chart illustrating an amplitude and phase shift values-setting process performed by the control device 60. The amplitude and phase shift values-setting process performed by the control device 60 is described using the flow chart in FIG. 8.

Upon starting the amplitude and phase shift values-setting process, the vehicle information acquirer 61 of the control device 60 acquires the location information about the vehicle 100, the nose direction information about the vehicle 100, and the vehicle state information about the vehicle 100. The vehicle information acquirer 61 transmits the acquired information to the orientation direction calculator 64 and the location calculator 65 (Step S101).

Upon acquiring the information about the vehicle 100, the satellite information acquirer 62 of the control device 60 acquires information about the satellite 200 including a location of the satellite 200 and a frequency and a polarization used for communication. The satellite information acquirer 62 transmits the acquired information to the signal controller 63, the orientation direction calculator 64, and the location calculator 65 (Step S102).

Upon acquiring the information about the satellite 200, the signal controller 63 of the control device 60 controls the signal source 10 on the basis of the information about the satellite 200 transmitted from the satellite information acquirer 62 to set an output frequency of a signal (Step S103).

Upon setting the frequency of the output signal, the orientation direction calculator 64 of the control device 60 calculates, on the basis of the transmitted information about the vehicle 100 and the transmitted information about the satellite 200, the azimuth angle $\varphi$ and the elevation angle $\theta$ that indicate an orientation direction of the emitted electromagnetic radiation. The orientation direction calculator 64 transmits the calculated orientation direction to the phase shift value calculator 66 (Step S104).

Upon calculating the orientation direction, the location calculator 65 of the control device 60 calculates, on the basis of the transmitted information about the vehicle 100 and the transmitted information about the satellite 200, the relative position between the plane of the geostationary orbit and the phased array antenna 1. The location calculator 65 calculates, on the basis of the calculated relative position, the value $\varphi_0$ of the azimuth angle $\varphi$ parallel to the plane of the geostationary orbit. The location calculator 65 transmits the calculated value $\varphi_0$ to the amplification value calculator 67 (Step S105).

Upon calculating the value $\varphi_0$, the phase shift value calculator 66 of the control device 60 calculates, on the basis of the orientation direction transmitted from the orientation direction calculator 64, a phase shift value of the signal relative to each of the phase shifters $30_1$ to $30_n$. The phase shift value calculator 66 transmits the calculated phase shift value to each of the phase shifters $30_1$ to $30_n$ (Step S106).

Upon calculating the phase shift value, the amplification value calculator 67 of the control device 60 calculates, on the basis of the value $\varphi_0$ transmitted from the location calculator 65, an amplification value of the signal relative to each of the amplifiers $40_1$, $40_2$, . . . and $40_n$. The amplification value calculator 67 transmits the calculated amplification value to each of the amplifiers $40_1$, $40_2$, . . . and $40_n$ (Step S107). The amplitudes of the amplifiers, among the amplifiers 40, that are arranged in the central area are greater than those of the amplifiers, among the amplifiers 40, that are arranged on the area surrounding the central area.

Upon calculating the amplification value, the vehicle information acquirer 61 and the satellite information acquirer 62 of the control device 60 respectively determine whether the information about the vehicle 100 or the information about the satellite 200 are changed (Step S108). In a case in which a determination that the information has changed is made (Yes in Step S108), the amplitude and phase shift values-setting process returns to the Step S101.

In a case in which a determination that the information has not changed is made (No in Step S108), the process ends.

The phased array antenna 1 according to Embodiment 1 can emit electromagnetic wave having the low side lobe characteristic in the plane of the geostationary orbit by having the above structure and by performing the amplitude and phase shift values-setting process. In other words, the phased array antenna according to the present embodiment can more improve a side lobe characteristic relative to the angle parallel to the plane of the geostationary orbit than that relative to another angle. Although another satellite other than the satellite 200 with which communication is established exists in the plane of the geostationary orbit, emission of the electromagnetic wave having the low side lobe characteristic relative to the plane of the geostationary orbit can decrease a possibility that the electromagnetic wave interfere with the other satellite.

By recalculation of the phase shift value and the amplification value in accordance with a change of a state of the vehicle 100 or the satellite 200, the phased array antenna 1 according to Embodiment 1 enables the angle having a side lobe characteristic more improved than the other angle to follow the plane of the geostationary orbit in which the satellite 200 exists, where the satellite 200 is a satellite with which the phased array antenna 1 communicates.

The phased array antenna 1 according to Embodiment 1 can emit the electromagnetic wave having no low side lobe characteristic on the plane perpendicular to the plane of the geostationary orbit. As a result, total radiated power can be increased more in comparison with electromagnetic radiation having low side lobe characteristic in each plane, thereby enabling an improvement in the equivalent isotropic radiated power (EIRP).

Generally, improvement of the EIRP requires an increase in antenna aperture size. The increase in the antenna aperture size requires an increase in the number of installed antenna elements and an increase in the number of installed phase shifters and amplifiers, thereby leading to increases in cost of equipment and power consumption. The phased array antenna 1 according to Embodiment 1 can improve the EIRP without increasing the number of the installed phase shifters 30, amplifiers 40, and antenna elements 50.

Figure 9:
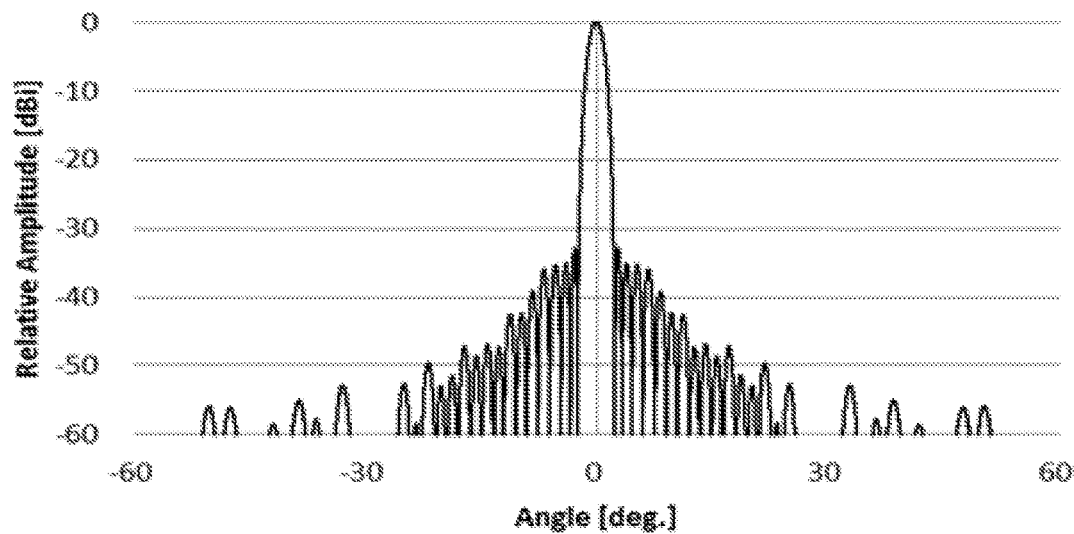
FIG. 9 is a graph illustrating an example of an electromagnetic radiation pattern occurring in the plane at $\varphi=\varphi_0$ in Embodiment 1.

FIG. 9 is a graph illustrating an example of an electromagnetic radiation pattern in the plane at $\varphi=\varphi_0$. Specifically, this radiation pattern is achieved in the 30 GHz band by a phased array antenna having a circular antenna aperture having a diameter of 400 mm. A horizontal axis in FIG. 9 indicates an angle relative to an orientation direction (unit: degree) taken to be 0°, and a vertical axis in FIG. 9 indicates a relative amplitude (unit: dBi) with respect to the orientation direction of the electromagnetic wave. As illustrated in FIG. 9, a low side lobe characteristic of the signal is achieved in the plane of the geostationary orbit where $\varphi=\varphi_0$.

Figure 10:
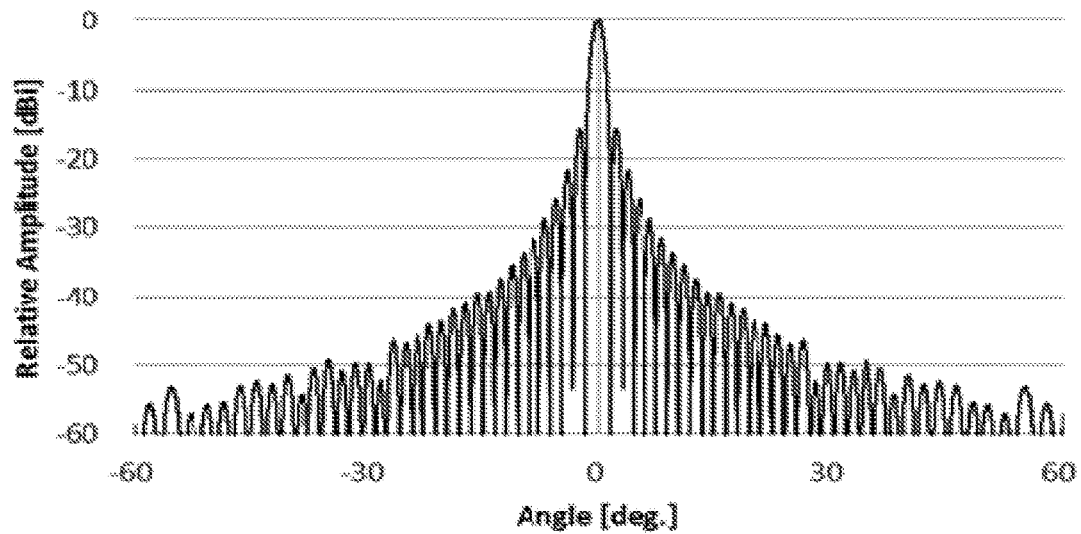
FIG. 10 is a graph illustrating an example of an electromagnetic radiation pattern occurring in the plane at $\varphi=\varphi_0+90°$ in Embodiment 1.

FIG. 10 is a graph illustrating an example of an electromagnetic radiation pattern in the plane at $\varphi=\varphi_0+90°$. Graph elements and antenna configuration are similar to those of FIG. 9. As illustrated in FIG. 10, a low side lobe characteristic of the signal is not achieved in the plane at $\varphi=\varphi_0+90°$. In comparison to a case in which the same amplitude distribution as produced on the plane at $\varphi=\varphi_0$ is also produced on the plane at $\varphi=\varphi_0+90°$, the electromagnetic radiation improves by about 2.5 dB in output power, about 0.2 dB in antenna gain, and about 2.7 dB in EIRP.

Embodiment 2

A phased array antenna 1 according to Embodiment 2 is described with reference to FIGS. 11-16.

Figure 11:
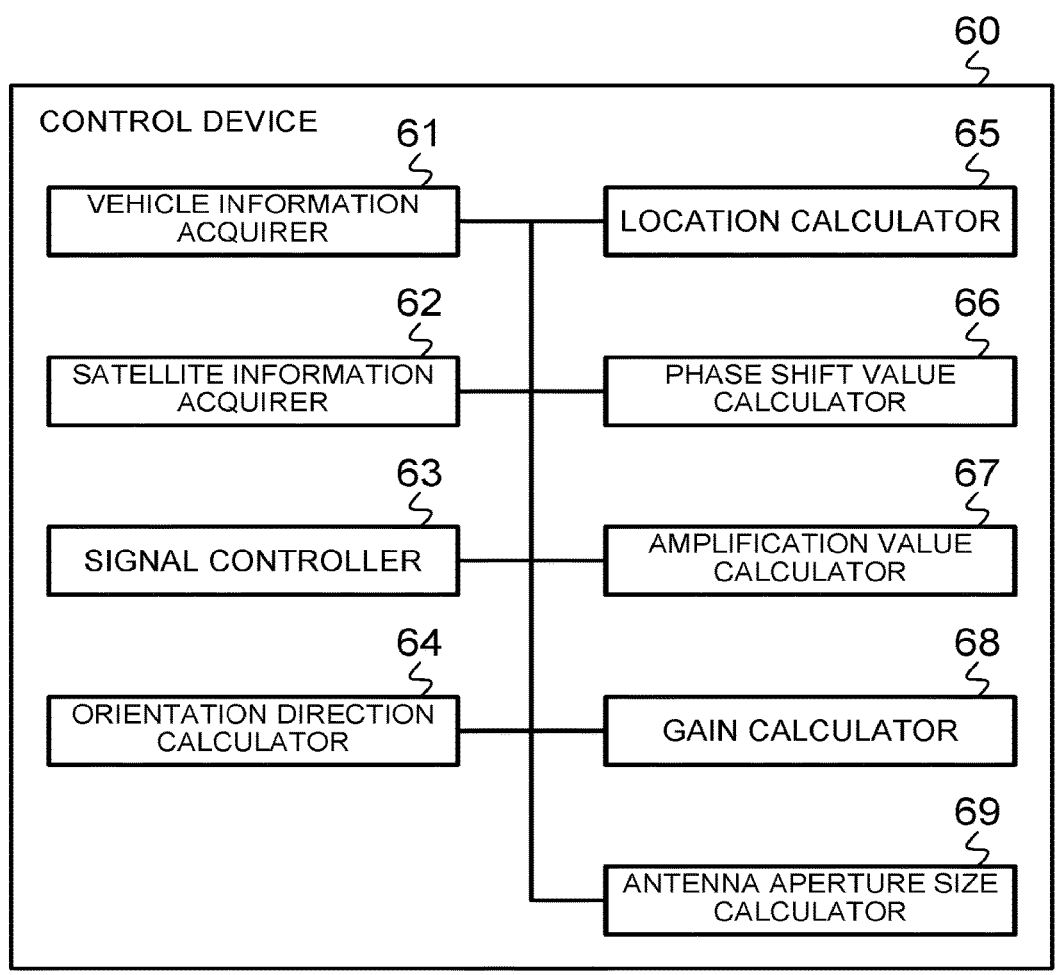
FIG. 11 is a block diagram illustrating a configuration of a control device according to Embodiment 2.

FIG. 11 is a block diagram illustrating a configuration of the control device 60. As illustrated in FIG. 11, the control device 60 of the phased array antenna 1 according to Embodiment 2 further include a gain calculator 68 to calculate a difference between a gain regarding an angle at which electromagnetic wave is emitted and a gain necessary for communication, and an antenna aperture size controller 69 to control the amplifiers and the phase shifters to change the antenna aperture size. The gain calculator 68 and the antenna aperture size controller 69 are electrically connected to other components of the control device 60 via a bus.

The gain calculator 68 receives the orientation direction calculated by the orientation direction calculator 64 and transmitted from the orientation direction calculator 64 and calculates a gain in a case which electromagnetic wave is emitted at the transmitted elevation angle $\theta$. The gain calculator 68 calculates, on the basis of the information about the vehicle 100 transmitted from the vehicle information acquirer 61 and the information about the satellite 200 transmitted from the satellite information acquirer 62, a value of the gain necessary for communication between the vehicle 100 and the satellite 200. An elevation angle $\theta_{MAX}$ is taken to be an angle achieving the gain in a case of the maximum size of the antenna aperture.

The gain calculator 68 calculates a gain difference between the gain in the case of the angle $\theta$ and the gain in the case of the angle $\theta_{MAX}$. The gain calculator 68 transmits the calculated gain difference to the antenna aperture size controller 69.

The antenna aperture size calculator 69 calculates, on the basis of the gain difference transmitted from the gain calculator 68, an antenna aperture size corresponding to the gain difference. The antenna aperture size calculator 69 stops supplying electricity to phase shifters 30 and amplifiers 40 in accordance with the calculated antenna aperture size to stop working the corresponding phase shifters 30 and amplifiers 40. Specifically, the outermost phase shifters of the phase shifters 30 and the outermost amplifiers of the amplifiers 40 are first stopped, and then the stoppage continues until the decreasing gain is equal to the gain difference.

Figure 12:
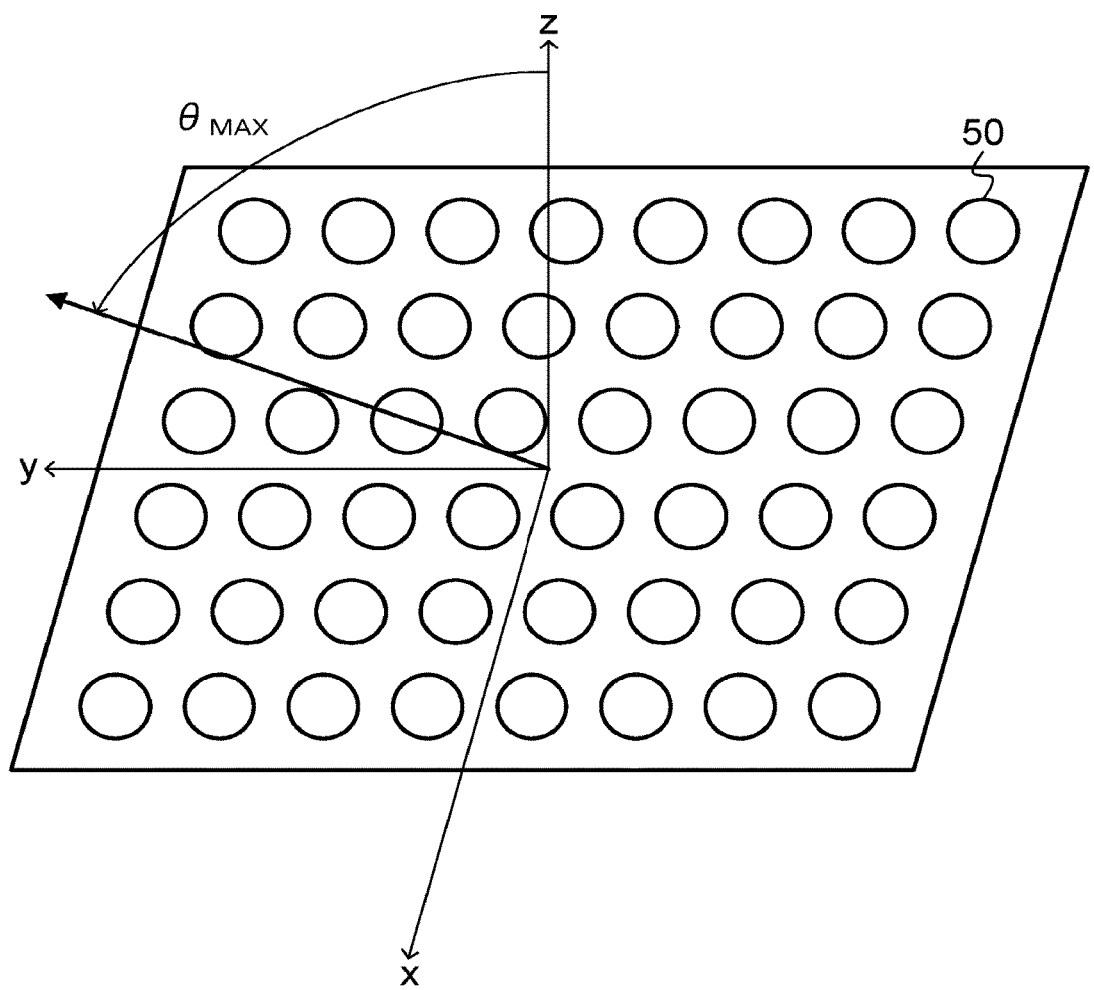
FIG. 12 is a perspective view illustrating a case in which antenna elements of Embodiment 2 transmit electromagnetic wave at an angle $\theta_{MAX}$.
Figure 13:
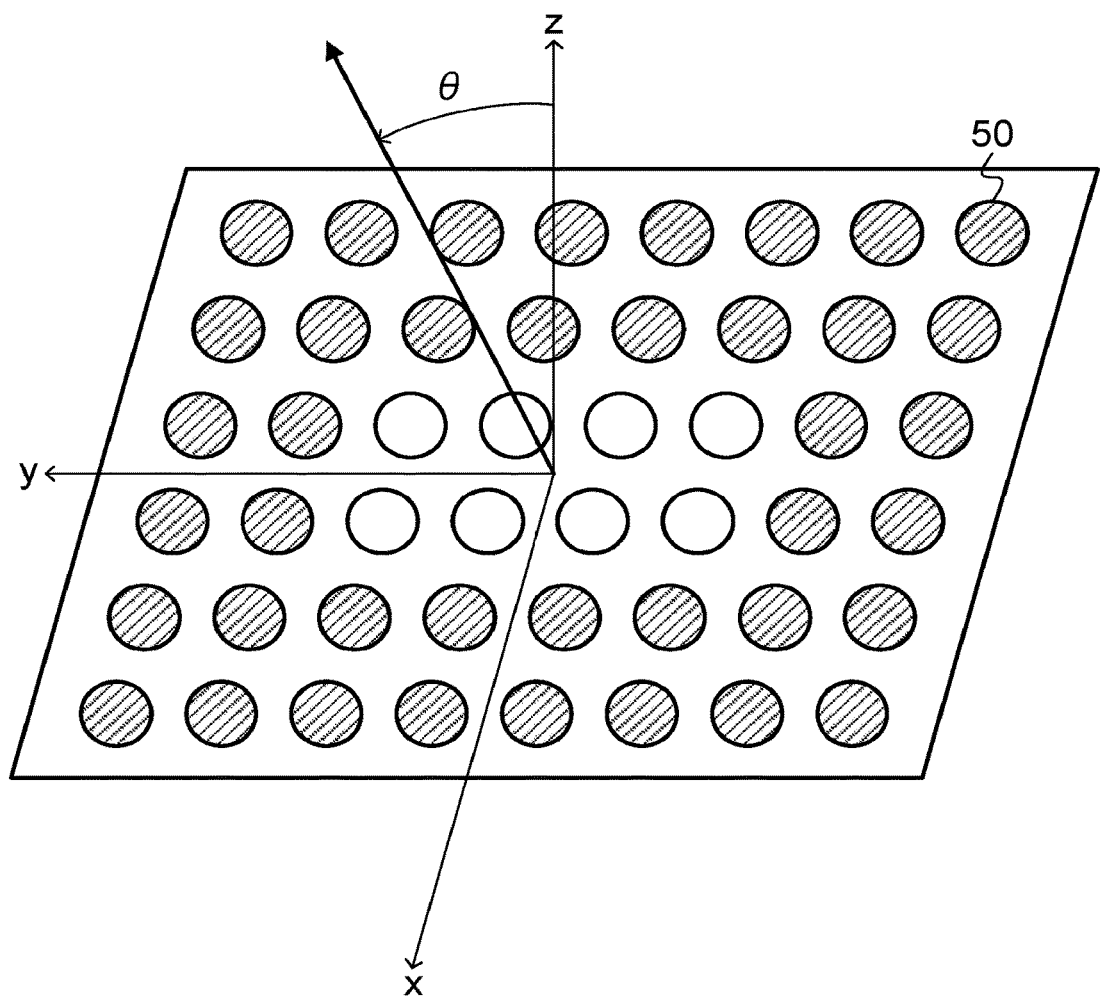
FIG. 13 is a perspective view illustrating a case in which the antenna elements of Embodiment 2 transmit electromagnetic wave at an angle $\theta$.

FIG. 12 is a perspective view illustrating a case in which antenna elements 50 transmit electromagnetic wave at the angle $\theta_{MAX}$. FIG. 13 is a perspective view illustrating a case in which antenna elements 50 transmit electromagnetic wave at the angle $\theta$ less than the angle $\theta_{MAX}$. In FIGS. 12 and 13, the antenna elements 50 that are in operation are indicated by outlined-type elements, and antenna elements 50 that are stopped are indicated by hatched elements.

In the case in which electromagnetic wave is emitted at the angle of $\theta_{MAX}$, there is need to maximize the antenna aperture size by operating all of the antenna elements 50 to maximize gain. As illustrated in FIG. 12, in the case in which the electromagnetic wave is emitted at the angle $\theta_{MAX}$, the antenna aperture size controller 69 continues to supply electricity to all of the phase shifters 30 and all of the amplifiers 40 to operate all of the antenna elements 50.

As illustrated in FIG. 13, in the case in which electromagnetic wave is emitted at the angle $\theta$ less than the angle $\theta_{MAX}$, the antenna aperture size controller 69 stops supplying electricity to phase shifters of the phase shifters 30 and amplifiers of the amplifiers 40 that correspond to an antenna aperture size corresponding to the gain difference, that is, an excess gain, to stop working antenna elements of the antenna elements 50 that are connected to such phase shifters 30 and amplifiers 40.

Figure 14:
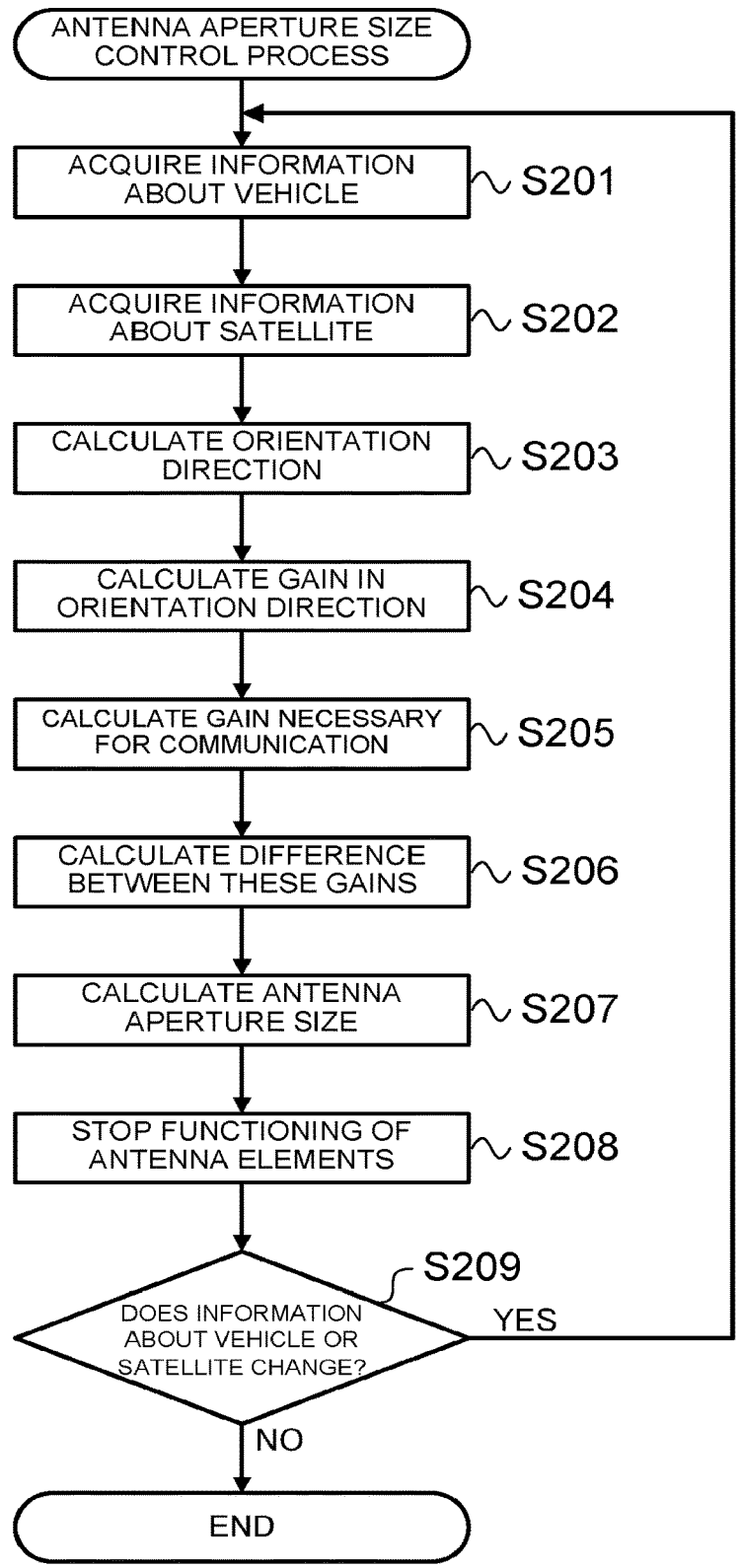
FIG. 14 is a flow chart illustrating a process of controlling an antenna aperture size in Embodiment 2.

FIG. 14 is a flow chart illustrating an antenna aperture size control process performed by the control device 60. The antenna aperture size control process performed by the control device 60 is described using the flow chart illustrated in FIG. 14. The antenna aperture size control process illustrated in FIG. 14 is executed before or after, or in parallel with the amplitude and phase shift values-setting process illustrated in FIG. 8.

The vehicle information acquirer 61 of the control device 60 acquires the location information, the nose direction information, and the vehicle state information about the vehicle 100. The vehicle information acquirer 61 transmits the acquired information to the orientation direction calculator 64 and the gain calculator 68 (Step S201).

Upon acquiring the information about the vehicle 100, the satellite information acquirer 62 of the control device 60 acquires the information about the satellite 200 including the frequency and the polarization used for communication. The satellite information acquirer 62 transmits the acquired information to the signal controller 63, the orientation direction calculator 64, and the gain calculator 68 (Step S202).

Upon acquiring the information about the satellite 200, the orientation direction calculator 64 of the control device 60 calculates, on the basis of the transmitted information about the vehicle 100 and the transmitted information about the satellite 200, the elevation angle $\theta$ indicating the orientation direction of the electromagnetic wave emitted. The orientation direction calculator 64 transmits the calculated orientation direction to the gain calculator 68 (Step S203).

Upon calculating the orientation direction, the gain calculator 68 of the control device 60 calculates a gain in a case in which the electromagnetic wave is emitted at the transmitted elevation angle $\theta$ (Step S204).

Upon calculating the gain in the case of the angle $\theta$, the gain calculator 68 of the control device 60 calculates, on the basis of the transmitted information about the vehicle 100 and the transmitted information about the satellite 200, the gain necessary for communication between the vehicle 100 and the satellite 200, that is, the gain in the case in which the electromagnetic wave is emitted at the angle of $\theta_{MAX}$ (Step S205).

Upon calculating the gain in the case of the angle $\theta_{MAX}$, the gain calculator 68 of the control device 60 calculates the difference between the gain in the case of the angle $\theta$ and the gain in the case of the angle $\theta_{MAX}$. The gain calculator 68 transmits the calculated gain difference to the antenna aperture size controller 69 (Step S206).

Upon calculating the gain difference, the antenna aperture size controller 69 of the control device 60 calculates, on the basis of the gain difference transmitted from the gain calculator 68, the antenna aperture size corresponding to the gain difference (Step S207).

Upon calculating the antenna aperture size, the antenna aperture size controller 69 of the control device 60 stops supplying electricity to phase shifters 30 and amplifiers 40 that correspond to the calculated antenna aperture size to stop functioning of the antenna elements of the antenna elements 50 that are connected to such phase shifters and amplifiers (Step S208).

Upon stopping functioning such antenna elements of the antenna elements 50, the vehicle information acquire 61 and the satellite information acquire 62 of the control device 60 respectively determine whether there is change in the information about the vehicle 100 or the satellite 200 (Step S209). In a case in which a determination that the information is changed is made (Yes in Step S209), the process returns to the Step S201.

In a case in which the determination that the information is not changed is made (No in Step S209), the process ends.

The phased array antenna 1 according to Embodiment 2 not only exhibits the same effects as those of the phased array antenna 1 according to Embodiment 1, by having the above structure and by performing the antenna aperture size control process, also reduces power consumption by stopping functioning of a part of the phase shifters 30 and the amplifiers 40 in the case in which the antenna has excess gain.

Figure 15:
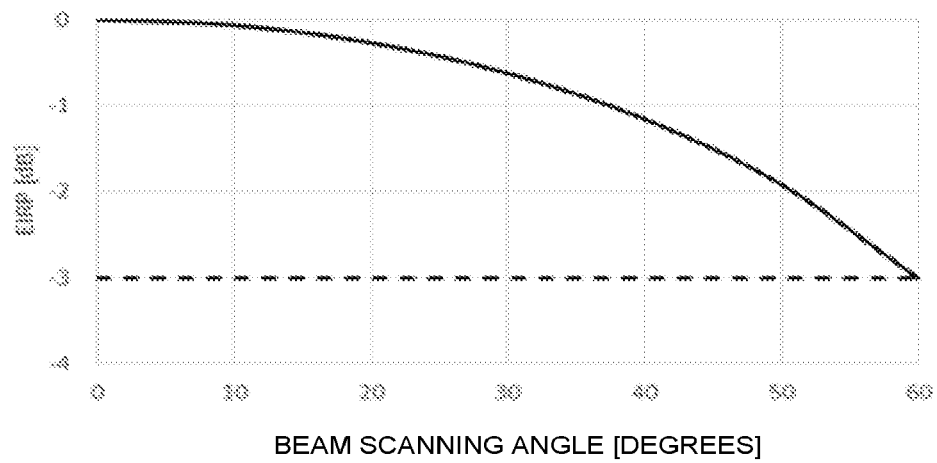
FIG. 15 is a graph illustrating EIRP relative to a beam scanning angle in Embodiment 2.

FIG. 15 is a graph illustrating EIRP relative to a beam scanning angle. A horizontal axis in FIG. 15 indicates the beam scanning angle (unit: degree), and a vertical axis in FIG. 15 indicates EIRP (unit: dB). The solid line denotes EIRP of the phased array antenna 1 according to Embodiment 2, and the dashed line denotes EIRP of a phased array antenna for comparison in which none of the phase shifters and the amplifiers are stopped. In FIG. 15, $\theta_{MAX}=60°$.

As illustrated in FIG. 15, an orientation direction of the electromagnetic wave at an angle less than the angle $\theta_{MAX}=60°$ causes excess EIRP and thus the antenna inevitably consumes excess power. The phased array antenna 1 according to Embodiment 2 can reduce power consumption in a range of the orientation direction of the electromagnetic wave of "$0°\le\theta<60°$".

Figure 16:
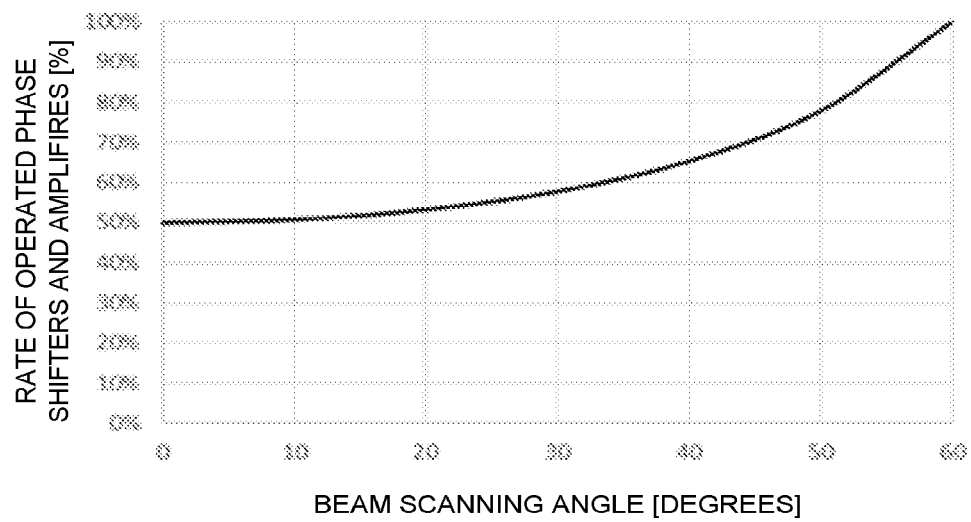
FIG. 16 is a graph illustrating a rate of utilization of the phase shifters and the amplifiers relative to the beam scanning angle in Embodiment 2.

FIG. 16 is a graph illustrating a rate of utilization of the phase shifters 30 and amplifiers 40 relative to the beam scanning angle. A horizontal axis in FIG. 16 indicates the beam scanning angle (unit: degree), and an vertical axis in FIG. 16 indicates a rate of operated phase shifters 30 and amplifiers 40 relative to all of the phase shifters 30 and amplifiers 40 (unit: %). In FIG. 16 as well as FIG. 15, $\theta_{MAX}=60°$.

As illustrated in FIG. 16, the phased array antenna 1 according to Embodiment 2 can decrease the rate of utilization of the phase shifters 30 and the amplifiers 40 as the beam scanning angle decreases. Accordingly, in a case in which the beam scanning angle is small, power consumption can be reduced at the rate indicated in FIG. 16.

Embodiment 3

A phased array antenna 1 according to Embodiment 3 is described with reference to FIGS. 17 and 18.

The phased array antenna 1 according to Embodiment 3 has a structure similar to that of the phased array antenna 1 according to Embodiment 2.

The antenna aperture size controller 69 of the phased array antenna 1 according to Embodiment 3 acquires, from the gain acquirer 68, the gain difference between the gain in the case of the angle θ and the gain in the case of the angle $\theta_{MAX}$. The antenna aperture size controller 69 acquires, from the location calculator 65, the value $\varphi_0$ of the azimuth angle φ parallel to the plane of the geostationary orbit.

The antenna aperture size controller 69 stops supplying electricity to the phase shifters 30 and amplifiers 40 that correspond to the antenna aperture size corresponding to the gain difference, thereby causing the stoppage of such phase shifters 30 and amplifiers 40. The antenna aperture size controller 69 causes the array of phase shifters 30 and amplifiers 40 to form into a rectangular shape in operation without stoppage. One of diagonals of the rectangular shape formed by the phase shifters 30 and amplifiers 40 that are in operation is made to match a line tilted at the angle $\varphi_0$ by the antenna aperture size controller 69.

Figure 17:
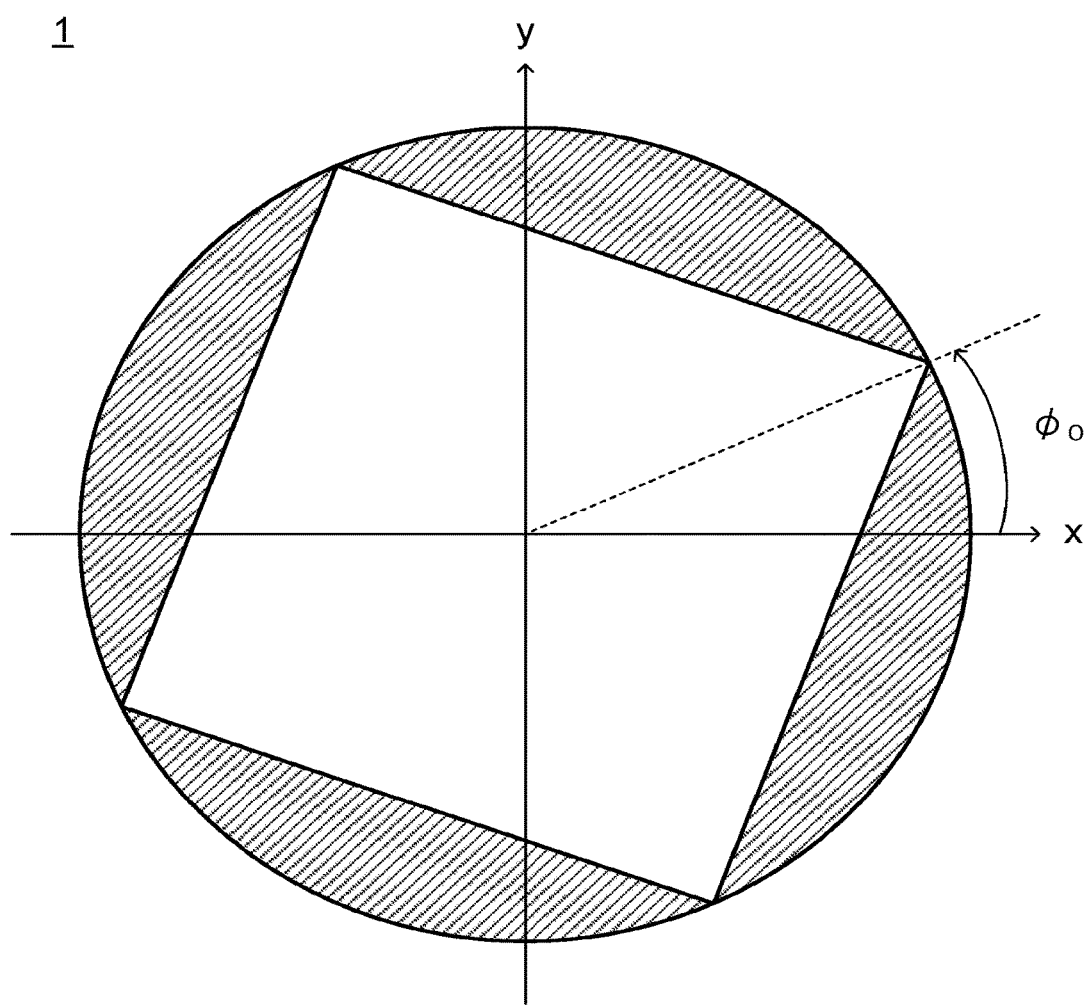
FIG. 17 is a top view of a phased array antenna according to Embodiment 3.

FIG. 17 is a top view of the phased array antenna 1. An outlined portion in FIG. 17 denotes an area in which antenna elements of the antenna elements 50 are in operation, and hatched portions denote areas in which antenna elements of the antenna elements 50 are stopped.

As illustrated in FIG. 17, the antenna aperture size controller 69 stops supplying electricity to phase shifters 30 and amplifiers 40 that correspond to the antenna aperture size corresponding to the difference between the gains, that is, an excess gain to stop functioning the antenna elements of the antenna elements 50 that are connected to such phase shifters and amplifiers. The antenna elements of the antenna elements 50 that are in operation are arranged in a rectangular shape, and one of the diagonals of the rectangular shape is made to match the line tilted at the angle $\varphi_0$.

The phased array antenna 1 according to Embodiment 3 having the above structure can exhibit the same effects as the phased array antenna 1 according to Embodiment 2.

The antenna having the rectangular antenna aperture has a low side lobe characteristic in a plane perpendicular to the diagonal of the rectangular antenna aperture. The phased array antenna 1 according to Embodiment 3 can achieve the low side lobe characteristic in the plane of the geostationary orbit by causing the plane perpendicular to the diagonal of the rectangular antenna aperture to match the plane of the geostationary orbit.

Figure 18:
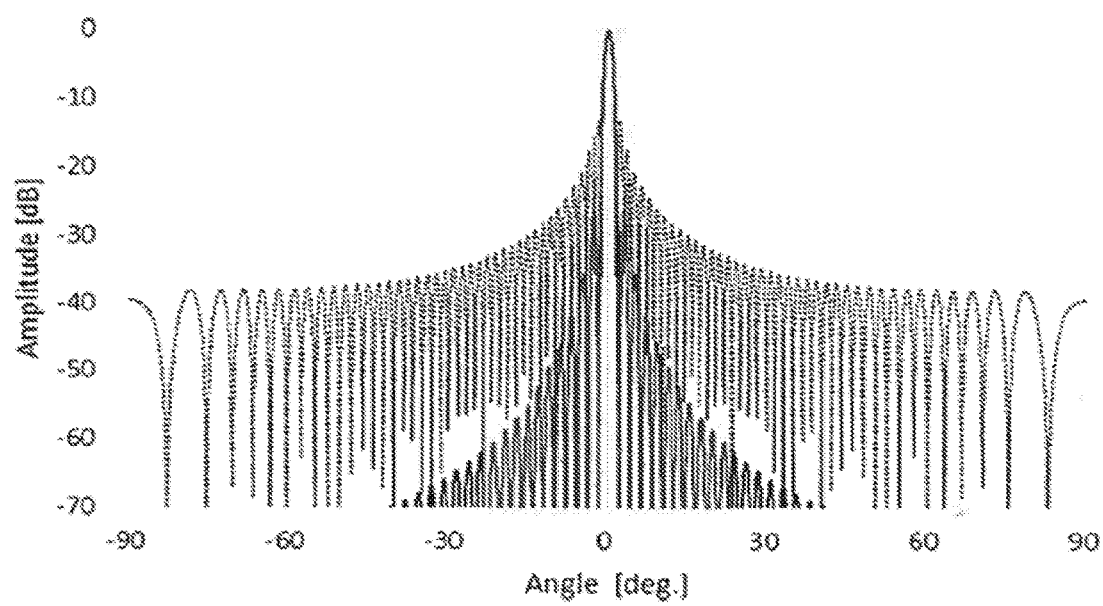
FIG. 18 is a graph illustrating examples of electromagnetic radiation patterns in Embodiment 3.

FIG. 18 is a graph illustrating examples of electromagnetic radiation patterns in the plane at the angle $\varphi=\varphi_0$ and the plane at the angle $\varphi=\varphi_0+90°$. A solid line in FIG. 18 denotes the electromagnetic radiation pattern in the plane at the angle $\varphi=\varphi_0$ and a dashed line in FIG. 18 denotes the electromagnetic radiation pattern in the plane at the angle $\varphi=\varphi_0+90°$. A horizontal axis in FIG. 18 indicates an angle relative to the orientation direction (unit: degree), and a vertical axis in FIG. 18 indicates an amplitude (unit: dB). As illustrated in FIG. 18, a low side lobe characteristic of the signal is achieved in the plane of the geostationary orbit that is the plane at the angle $\varphi=\varphi_0$. However, no low side lobe characteristic of the signal is achieved in the plane at the angle $\varphi=\varphi_0+90°$.

The present disclosure is not limited to the above embodiments and modifications are possible. For example, although the antenna elements 50 are arranged in a rows and b columns on the plane in the above embodiments, the present disclosure is not limited to such configuration. The antenna elements 50 may be arranged in any shape such as, for example, an ellipse or a polygon. Alternatively, the antenna elements 50 may be arranged on a curved surface instead of arranging the antenna elements 50 in the same plane.

Although the control device 60 is configured to form an amplitude distribution such as a Taylor distribution in the plane of the geostationary orbit, the present disclosure is not limited to such configuration. Examples of amplitude distributions formed in the plane of the geostationary orbit by the control device 60 include the Gaussian distribution. Also, the control device 60 may form any amplitude distribution in which values of the amplitude at the central portion of the distribution are greater than values of the amplitude at the peripheral portions of the distribution.

Although the control device 60 is configured to form the uniform amplitude distribution in the plane perpendicular to the plane of the geostationary orbit, the present disclosure is not limited to such a configuration. The control device may form any amplitude distribution enabling an increase in total radiated power.

Although the vehicle 100 is an aircraft such as a fixed-wing aircraft or a rotorcraft in the above embodiments, the vehicle 100 is not limited to aircraft. The vehicle 100 may be a vehicle such as a ship or a car. Accordingly, the vehicle 100 can be regarded as a moving body 100. Accordingly, the nose direction information can be regarded as front portion direction information, and the vehicle state information can be regarded as moving body state information. Moreover, the vehicle information acquirer 61 can be regarded as a moving body information acquirer 61.

Although the satellite 200 orbits in the geostationary orbit in the above embodiments, the present disclosure is not limited to such an orbit. The satellite 200 may orbit in any orbit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-114670, filed on Jun. 9, 2017, the entire disclosure of which is incorporated by reference herein.

INDUSTRIAL APPLICABILITY

The present disclosure is applicable to phased array antennas.

REFERENCE SIGNS LIST

1 Phased array antenna
10 Signal source

20 Distribution circuit
30, 30$_1$-30$_n$ Phase shifter
40, 40$_1$-40$_n$ Amplifier
50, 50$_1$-50$_n$ Antenna element
60 Control device
61 Vehicle information acquirer
62 Satellite information acquirer
63 Signal controller
64 Orientation direction calculator
65 Location calculator
66 Phase shift value calculator
67 Amplification value calculator
68 Gain calculator
69 Antenna aperture size controller
100 Vehicle
200 Satellite

The invention claimed is:

1. A phased array antenna comprising:
a signal source to generate a signal;
a distribution circuit to divide the signal generated by the signal source;
phase shifters to shift phases of signals divided by the distribution circuit;
amplifiers to amplify signals output by the phase shifters;
antenna elements arranged on a plane to emit, as an electromagnetic wave, the signals output by the amplifiers; and
a control device to control the amplifiers such that, in an intersection line between a plane that is parallel to an orbital plane of a satellite with which communication of the electromagnetic wave is established and the plane on which the antenna elements are arranged, amplitudes of amplifiers, among the amplifiers, that are connected to antenna elements, among the antenna elements, arranged in a center of the plane are greater than amplitudes of amplifiers, among the amplifiers, that are connected to antenna elements, among the antenna elements, arranged at a periphery of the plane.

2. The phased array antenna according to claim 1, wherein the control device controls the amplifiers such that, in a plane parallel to the orbital plane, amplitudes of amplifiers, among the amplifiers, which are arranged in a center of the plane are greater than amplitudes of the amplifiers arranged at the periphery of the plane so that the electromagnetic wave has a low side lobe characteristic on the orbital plane.

3. The phased array antenna according to claim 1, wherein the control device controls the amplifiers to form a uniform amplitude in a plane of the electromagnetic wave that is perpendicular to the orbital plane.

4. The phased array antenna according to claim 2, wherein the control device controls the amplifiers to form a uniform amplitude in a plane of the electromagnetic wave that is perpendicular to the orbital plane.

5. The phased array antenna according to claim 1, wherein the control device comprises:
a moving body information acquirer to acquire information about a moving body on which the antenna elements are disposed;
a satellite information acquirer to acquire information about the satellite;
an orientation direction calculator to calculate, from the information about the moving body and the information about the satellite, an orientation direction of the electromagnetic wave emitted;
a location calculator to calculate a relative position between the orbital plane and the moving body and then calculate, from the calculated relative position, an angle of the plane of the electromagnetic wave parallel to the orbital plane;
a phase shift value calculator to calculate a phase shift value relative to each of the phase shifters for directing the electromagnetic wave in the orientation direction; and
an amplification value calculator to calculate, from the angle of the plane parallel to the orbital plane, an amplification value relative to each of the amplifiers.

6. The phased array antenna according to claim 2, wherein the control device comprises:
a moving body information acquirer to acquire information about a moving body on which the antenna elements are disposed;
a satellite information acquirer to acquire information about the satellite;
an orientation direction calculator to calculate, from the information about the moving body and the information about the satellite, an orientation direction of the electromagnetic wave emitted;
a location calculator to calculate a relative position between the orbital plane and the moving body and then calculate, from the calculated relative position, an angle of the plane of the electromagnetic wave parallel to the orbital plane;
a phase shift value calculator to calculate a phase shift value relative to each of the phase shifters for directing the electromagnetic wave in the orientation direction; and
an amplification value calculator to calculate, from the angle of the plane parallel to the orbital plane, an amplification value relative to each of the amplifiers.

7. The phased array antenna according to claim 3, wherein the control device comprises:
a moving body information acquirer to acquire information about a moving body on which the antenna elements are disposed;
a satellite information acquirer to acquire information about the satellite;
an orientation direction calculator to calculate, from the information about the moving body and the information about the satellite, an orientation direction of the electromagnetic wave emitted;
a location calculator to calculate a relative position between the orbital plane and the moving body and then calculate, from the calculated relative position, an angle of the plane of the electromagnetic wave parallel to the orbital plane;
a phase shift value calculator to calculate a phase shift value relative to each of the phase shifters for directing the electromagnetic wave in the orientation direction; and
an amplification value calculator to calculate, from the angle of the plane parallel to the orbital plane, an amplification value relative to each of the amplifiers.

8. The phased array antenna according to claim 1, wherein the control device stops functioning of a part of the phase shifters and a part of the amplifiers to reduce an antenna aperture size.

9. The phased array antenna according to claim 2, wherein the control device stops functioning of a part of the phase shifters and a part of the amplifiers to reduce an antenna aperture size.

10. The phased array antenna according to claim 3, wherein
the control device stops functioning of a part of the phase shifters and a part of the amplifiers to reduce an antenna aperture size.

11. The phased array antenna according to claim 4, wherein
the control device stops functioning of a part of the phase shifters and a part of the amplifiers to reduce an antenna aperture size.

12. The phased array antenna according to claim 5, wherein
the control device further comprises:
a gain calculator to calculate a gain relative to the orientation direction calculated by the orientation direction calculator, calculate, form the information about the moving body and the information about the satellite, a gain necessary for communication between the moving body and the satellite, and calculate a difference between the calculated gain necessary for the communication and the gain relative to the orientation direction; and
an antenna aperture size controller to calculate an antenna aperture size corresponding to the difference and then stop functioning of amplifiers, among the amplifiers, and phase shifters, among the phase shifters, that correspond to the antenna aperture size corresponding to the calculated difference.

13. The phased array antenna according to claim 6, wherein
the control device further comprises:
a gain calculator to calculate a gain relative to the orientation direction calculated by the orientation direction calculator, calculate, form the information about the moving body and the information about the satellite, a gain necessary for communication between the moving body and the satellite, and calculate a difference between the calculated gain necessary for the communication and the gain relative to the orientation direction; and
an antenna aperture size controller to calculate an antenna aperture size corresponding to the difference and then stop functioning of amplifiers, among the amplifiers, and phase shifters, among the phase shifters, that correspond to the antenna aperture size corresponding to the calculated difference.

14. The phased array antenna according to claim 7, wherein
the control device further comprises:
a gain calculator to calculate a gain relative to the orientation direction calculated by the orientation direction calculator, calculate, form the information about the moving body and the information about the satellite, a gain necessary for communication between the moving body and the satellite, and calculate a difference between the calculated gain necessary for the communication and the gain relative to the orientation direction; and
an antenna aperture size controller to calculate an antenna aperture size corresponding to the difference and then stop functioning of amplifiers, among the amplifiers, and phase shifters, among the phase shifters, that correspond to the antenna aperture size corresponding to the calculated difference.

15. The phased array antenna according to claim 12, wherein
the antenna aperture size controller causes amplifiers, among the amplifiers, and phase shifters, among the phase shifters, that are arranged in a rectangular shape to operate without stopping the amplifiers arranged in the rectangular shape and the phase shifters arranged in the rectangular shape, and
one of diagonals of the rectangular shape is included in the plane parallel to the orbital plane.

16. The phased array antenna according to claim 13, wherein
the antenna aperture size controller causes amplifiers, among the amplifiers, and phase shifters, among the phase shifters, that are arranged in a rectangular shape to operate without stopping the amplifiers arranged in the rectangular shape and the phase shifters arranged in the rectangular shape, and
one of diagonals of the rectangular shape is included in the plane parallel to the orbital plane.

17. The phased array antenna according to claim 14, wherein
the antenna aperture size controller causes amplifiers, among the amplifiers, and phase shifters, among the phase shifters, that are arranged in a rectangular shape to operate without stopping the amplifiers arranged in the rectangular shape and the phase shifters arranged in the rectangular shape, and
one of diagonals of the rectangular shape is included in the plane parallel to the orbital plane.

18. The phased array antenna according to claim 5, wherein
the moving body is an aircraft.

19. The phased array antenna according to claim 12, wherein
the moving body is an aircraft.

20. The phased array antenna according to claim 15, wherein
the moving body is an aircraft.

* * * * *